Patented Mar. 25, 1930

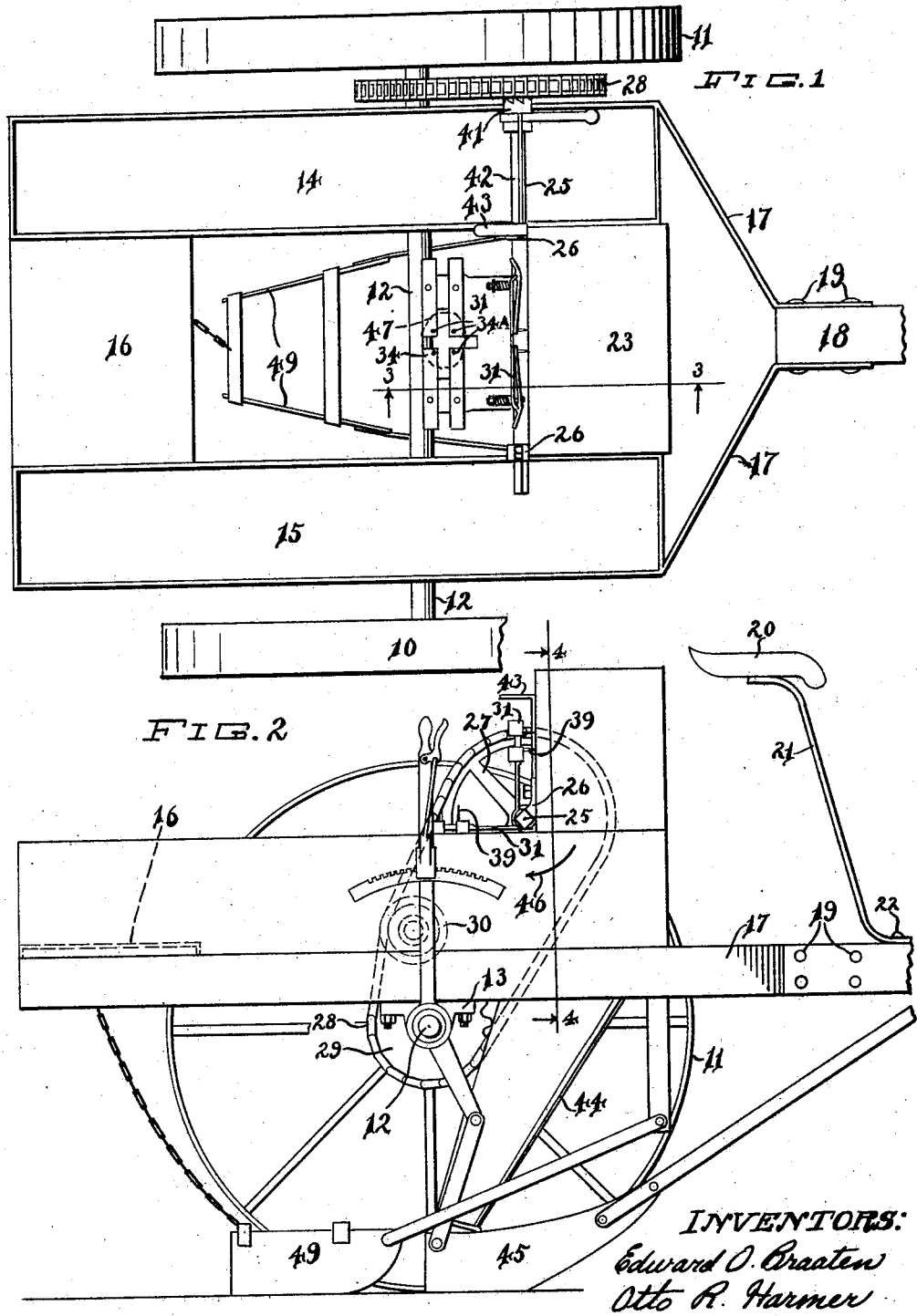

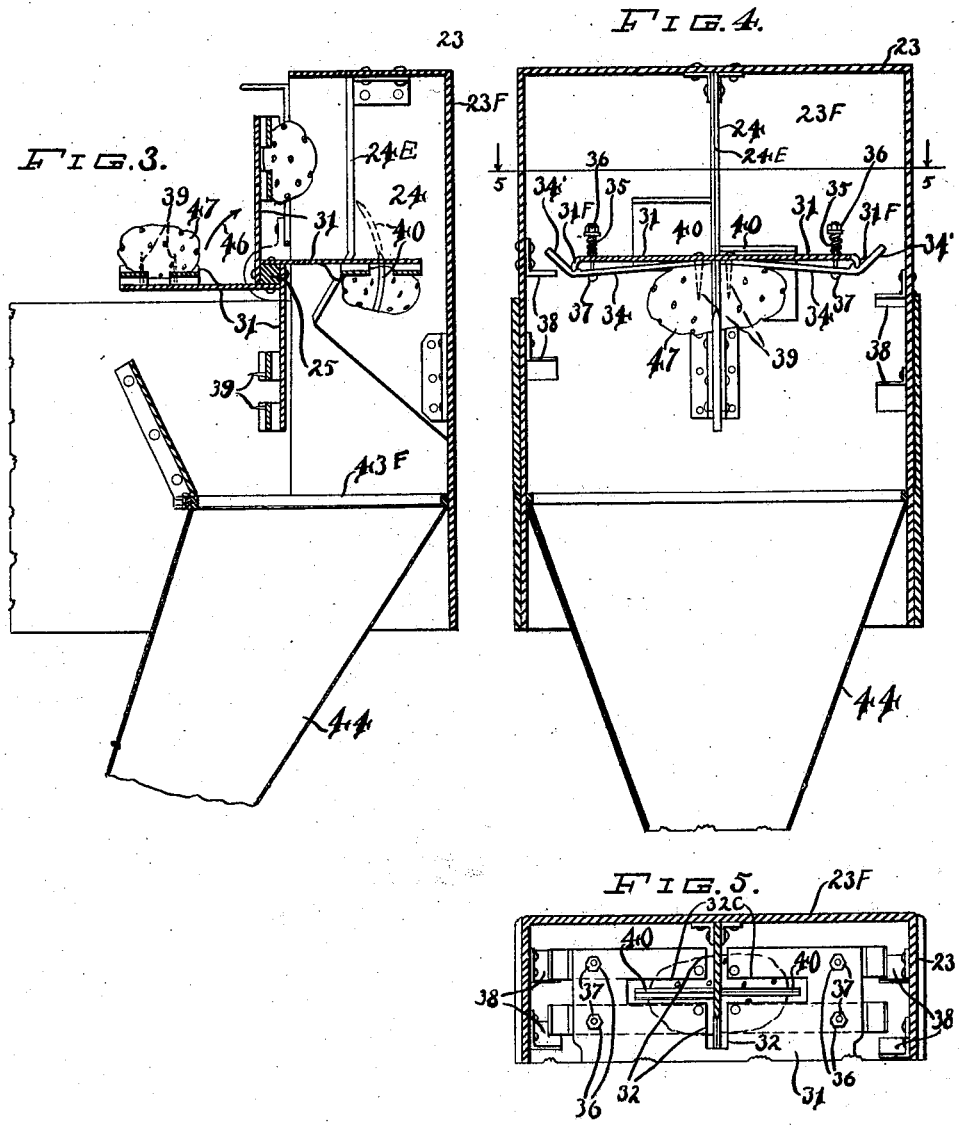

1,751,574

UNITED STATES PATENT OFFICE

EDWARD O. BRAATEN AND OTTO R. HARMER, OF NORTHFIELD, MINNESOTA

SEED-POTATO CUTTER AND PLANTER

Application filed June 9, 1927. Serial No. 197,563.

Our invention relates to a potato planter and the object is to provide a simple and efficient device, drawn by horse or tractor and which plants seed potatoes at certain predetermined spacing in each row. A further object is to provide a machine in which is carried a quantity of whole seed potatoes which are cut into four pieces and said pieces dropped into the furrow at equal intervals. Further objects will appear in the following specification, reference being had to the accompanying drawings in which:—

Fig. 1 is a top or plan view of our improved potato planter.

Fig. 2 is a right side elevation of our device with the near-side ground wheel omitted to more clearly expose certain details of mechanism, and a driver's seat added.

Fig. 3 is a longitudinal sectional elevation through the potato cutter housing about as on line 3—3 of Fig. 1.

Fig. 4 is a transverse vertical section of the potato cutter housing about as on line 4—4 in Fig. 2.

Fig. 5 is a sectional view on a horizontal line of the potato cutter housing, about as on line 5—5 of Fig. 4.

Referring to the drawing by reference numerals, 10 and 11 designate respectively the right and left ground wheels on an axle 12 rotatable by one of said wheels and journaled in bearings 13 supporting an elongated quadrangular frame. Said frame comprises a left side tray 14, a right side counterpart tray 15 spaced apart and arranged longitudinally of the machine, their adjacent rear ends being connected by a flat member 16 serving as a seat. The front end of the frame comprises, in part, two metal plates or bars 17 each suitably fixed to the front end of a tray and extending thence forwardly toward each other and their front extremities arranged parallel to be bolted on to the rear end of a draw bar 18 as at 19. 20 is a driver's seat of the agricultural type fixed on a support bar 21 secured at 22 on the draw bar 18 or any other suitable part.

23 is an inverted U-shaped sheet metal housing suitably fixed transversely between the front ends of the trays 14—15 and having a front wall 23F. Said housing is open rearwardly and affixed to its top and wall is a central vertical blade 24 having a rearwardly directed cutting edge 24E. This housing will hereinafter be designated as the cutter housing. 25 is a transverse horizontal shaft mounted in bearings 26 at the front of housing 23 and just above the tops of the trays 14—15, said shaft extending to the left and carrying a chain sprocket 27, (Fig. 2), outwardly of tray 14 driven by a chain 28 which in turn is driven by a chain sprocket 29 keyed on axle 12. 30 is a suitable chain belt tightener sprocket mounted between the sprockets 27 and 29. Said shaft 25 between its bearings, is of the square type in cross section and on said square part are mounted four radial wings or blades 31 of plate metal and quadrangular in form, said plates thus being ninety degrees apart. The outer edge or side parts of each blade 31 are flanged rearwardly as 31F, assuming the blade to be in vertical plane. Each blade has a cross-shaped opening comprising a central radial slot 32 opening outwardly at the outer edge of the blade and a cross slot 32C spaced from said outer edge, (see Fig. 5), said slots 32 so spaced as to straddle the blade 24 for a purpose to be described. 34 are a pair of trip arms arranged parallel to and on both sides of slot 32C and each pressed into pivotal engagement with the flange 31F by a coil spring 35 about a bolt 37 passed through the arm, thence through plate 31, said spring being under compression between plate 31 and nut 36 on the bolt and each pressing the inner end of its arm 34 against the plate at a point close to slot 32. The outer end of each arm 34 is beyond flange 31F and arranged each to engage a fixed trip arm 38 in its path, said trip arms being fixed to the side walls of housing 23, (see Figs. 4 and 5), at slot 32 where it is crossed by slot 32C all four corners are provided with prongs 39 projecting upwardly through registering apertures 34A in the arms 34 when each said plate 31 is in rearward horizontal position.

40 are a pair of knife-blades fixed one on each side of the main blade 24 and of arcuate form concentric of shaft 25, each blade with an upwardly directed cutting edge and the upper blade of each pair being fixed 1/16th of a circle of 22½ degrees above the lower blade, both blades being in the circular path of the slot 32C of all the wings 31.

In Fig. 1, 41 is a jaw-clutch member on shaft 25 adapted to be engaged with corresponding jaw members on the hub of gear 27 or disengaged therefrom to stop rotation of shaft 25 by means of a reach rod 42 and a hand lever 43 connected therewith, or other equivalent means may be used.

43F is a suitable open frame just below housing 23 and adapted to hold the upper open end of a flexible fabric funnel 44, depending therefrom, the lower end of said funnel opens downwardly between two furrow opening blades 45, the latter having suitable raising and lowering means common in the art.

In the use of our device the trays 14 and 15 are first filled with a supply of whole potatoes.

A rear operator sits on seat 16 between said trays, facing forward. The machine is then drawn forward and shaft 25 with its wings 31 are rotated by chain 27 and gears 29 and 27 in the direction of arrow 46 (Fig. 2). As each wing 31 swings upwardly and rearwardly, the operator takes a potato 47 from either tray and presses it down on the four prongs 39 and as near centrally thereon as possible. The potato is then of course retained on said prongs and on top of the four adjacent inner ends of the arms 34, and the potato is of course carried upwardly and rearwardly, as arrow 46 Fig. 3, being first pressed against the cutting edge 24E of the main blade 24 which thus splits the potato transversely in two. Immediately following this cutting and during the following movement of wing 31, the potato is cut in two longitudinally by the transverse arcuate blades 40. Up to this stage the potato, now cut in four pieces, remains on the prongs, but continued movement of the wing 31 brings the outer ends 34' of the arms 34 into contact with the obstructions 38 causing the inner ends of arms 34 to be forced away from the plate 31 and for each such movement of an arm 34 a piece of the potato held by the prong 39 projecting through it, is forced off said prong and drops into the funnel 44 which guides the said piece down to where it is dropped in the furrow between the furrow opening blades 45. This operation is more clear when it is understood that the potato is simply cut two ways to make four pieces of it, said pieces are forced loose by the arms 34, as described, one by one and dropped on the ground in corresponding equal spacing along the furrow.

49 in Figs. 1 and 2 represent any suitable type of furrow closing blades well known in the art, said blades merely following behind the furrow opener 45 and scooping the soil back over the planted potato pieces in the furrow.

The seat 20 is provided for a driver, and seat 16 is for the potato operator.

We claim:

1. In a seed potato cutter and planter device mounted on a wheel supported frame having potato carrying means, and a potato cutter housing mounted on said frame; a plurality of fixed cutter blades in said housing and arranged in crossed planes, a rotary multi-winged device rotatable in a plane longitudinally of the normal movement of the planter and mounted on a shaft rotated by suitable power means, said latter device comprising a plurality of radial plate-wings provided each with a central slot opening outwardly at the outer edge of the plate and a cross slot parallel to the said outer edge, four prongs fixed in said plate at the intersection of said slots and projecting upwardly when the plate is rotating in its upward movement, flat elongated cam arms having each an aperture straddling a prong at its inner edge and adjacent the radial slot, said cam arms projecting beyond the sides of the plate and pivoted at said edges, spring means pressing the inner ends of said arms against the plate and the prongs projecting upwardly therethrough, said cutter blades in the housing arranged in the path of said crossed slot to cut a potato held on said prongs in four pieces and each said piece on one of said prongs, and means for removing the potato pieces operative subsequent only to said cutting operation.

2. In a seed potato cutter and planter device mounted on a wheel supported frame having potato carrying means, and a potato cutter housing mounted on said frame; a plurality of fixed cutter blades in said housing and arranged in crossed planes, a rotary multi-winged device rotatable in a plane longitudinally of the normal movement of the planter and mounted on a shaft rotated by suitable power means, said latter device comprising a plurality of radial plate-wings provided each with a central slot opening outwardly at the outer edge of the plate and a cross slot parallel to the said outer edge, four prongs fixed in said plate at the intersection of said slots and projecting upwardly when the plate is rotating in its upward movement, flat elongated cam arms having each an aperture straddling a prong at its inner edge and adjacent the radial slot, said cam arms projecting beyond the sides of the plate and pivoted at said edges, spring means pressing the inner ends of said arms against the plate and the prongs projecting upwardly therethrough, said cutter blades in the housing arranged in the path of said crossed slot to cut a potato held on said prongs in four pieces and each said piece on one of said prongs, and means for removing the potato pieces operative subsequent only to said cutting operation, said means for removing the pieces of potato comprising obstructions fixed in the outer walls of the cutter housing one in the path of the projecting ends of said cam arms to swing each said arm on its pivot and spread its inner end away from the plate and push the piece of potato off its prongs, and said obstructions fixed in alternating circular alinement relative to the shaft of rotary cutting device.

In testimony whereof we affix our signatures.

EDWARD O. BRAATEN.
OTTO R. HARMER.